United States Patent [19]

Komine

[11] 4,050,796
[45] Sept. 27, 1977

[54] MOTION PICTURE CAMERA PRESENTING A FOLDABLE GRIP

[75] Inventor: Yoshio Komine, Yokohama, Japan

[73] Assignee: Canon Kabushiki Kaisha, Tokyo, Japan

[21] Appl. No.: 658,163

[22] Filed: Feb. 17, 1976

[30] Foreign Application Priority Data

Feb. 20, 1975  Japan .................................. 50-21334

[51] Int. Cl.² .......................................... G03B 17/00
[52] U.S. Cl. .................................... 352/243; 352/95; 352/197; 354/80
[58] Field of Search ................. 352/95, 176, 197, 243; 354/80, 81, 82

[56] References Cited

U.S. PATENT DOCUMENTS

| | | | |
|---|---|---|---|
| 3,597,068 | 8/1971 | Masuyama | 352/243 |
| 3,602,586 | 8/1971 | Bartl | 352/243 |
| 3,792,921 | 2/1974 | Zwerger | 352/243 |
| 3,913,116 | 10/1975 | Kastner | 352/243 |

*Primary Examiner*—Monroe H. Hayes
*Attorney, Agent, or Firm*—Toren, McGeady and Stanger

[57] ABSTRACT

The present invention relates to a motion picture camera presenting a grip which can be folded from the operation state for bearing the camera body into the loaded state, being characterized in that the camera presents a rotation shaft of the grip parallel to the optical axis of the photographic lens and a release button for the camera release coaxially to the rotation shaft of the grip.

17 Claims, 10 Drawing Figures

MOTION PICTURE CAMERA PRESENTING A FOLDABLE GRIP

BACKGROUND OF THE INVENTION

1. Field of the Invention

The present invention relates to a motion picture camera presenting a grip which can be folded from the operation state for bearing the camera body into the loaded state, particularly to a camera which presents a rotation shaft of the grip parallel to the optical axis of the photographic lens and a release button for the camera release coaxially to the rotation shaft of the grip.

2. Description of the Prior Art:

Until now it has been general that a grip is provided on a part of the body of the motion picture camera in order to obtain a stable holding of the camera at the time of taking pictures. Further the interior of the grip has often been made use of as the loading chamber of the current source. However, in order to realize such a grip, the external dimension of the camera becomes necessarily large. Further the portability of the camera becomes inferior.

Under such circumstances in case of the recent motion picture camera, it is so designed that such a grip can be folded so as to obtain a better portability when the grip is not used or the tripod is used. However, in case of most of the motion picture camera presenting such a foldable grip it is so designed that the grip in the folded state is loaded in the bottom of the camera body along the lengthwise direction, namely parallel to the optical axis of the photographic lens. In consequence in case of such a camera the total height of the camera when the grip is folded is increased and further the screw part for mounting the tripod is provided on the movable grip or on a part with small portion excluding the grip loading part in the bottom of the camera body, so that the stability of the camera when the tripod is used is remarkably decreased. Further in case of other types of the conventional camera, it is so designed that the rotation shaft of the foldable grip is crossed the optical axis of the photographic lens and the grip in the folded state is loaded in the side part of the camera along the lengthwise of the camera. In case of this type of camera it is possible to provide the screw part for mounting the tripod on a comparatively large portion on the bottom surface of the camera body while the position of the grip in the operation state is largely distant from the center of gravity so that the operatively as well as the stability of the camera when the grip is used is decreased.

On the other hand, a motion picture camera in which the rotation shaft of the grip is provided parallel to the optical axis of the photographic lens is already proposed for example by U.S. Pat. No. 3,597,068 ( corresponding to DGm 6,933,218) of DOLS 2,202,776, whereby in case of this proposed type the total height of the camera in which the grip is folded into the loaded state is not increased at least while a comparatively large portion in the bottom surface of the camera body is available for the screw part for mounting the tripod so that the stability of the camera when the tripod is used can be much improved as compared with other cameras. For example, in case of the motion picture camera proposed for example by U.S. Pat. No. 3,597,068 the driving motor is provided so as to project from the lower part of the front of the camera body whereby the grip is born in the projecting motor so as to rotate around this projecting motor as shaft in such a manner that the grip can selectively assume the loaded state in which the grip covers the photographic lens provided on the front of the camera body, the view finder aperture and the photocell of the exposure meter or, being rotated by 180° from the loaded state, the operation state in which the photographic lens, the view finder aperture and the photocell are all disclosed. Further in case of the motion picture camera proposed by DOLS 2,202,776 it is so designed that the grip can selectively assume the operation state in which the camera body is born by the bottom surface or, being rotated by 180° from the loaded state, the loaded state in which the grip is folded remaining a gap between the side of the camera body and the folded grip in which a finger (index) can be put in. For these cameras mentioned above the above mentioned profits can be expected.

However, on the other hand, in case of the camera projected by U.S. Pat. No. 3,597,068 the grip in the operation state bears the camera body by means of the motor projecting from the lower part of the front of the camera body so that the center of gravity of the camera body is remarkabiy before the supporting point in such a manner that the stability of the camera when the grip is used is remarkably decreased while in case of the camera proposed by DOLS 2,202,776 the grip can be folded in the loaded state in such a manner that a space in which a finger can be put in is left so that the total width of the camera when the grip is folded is remarkably increased, which is very inconvenient.

A part from the above, it is general that in case the grip is foldable it is necessary to consider the position of the operation button for the camera release. Namely, if the stress is put only on the operabilty of the release button the above mentioned inconvenience often takes place for the foldable grip, while if the stress is put on only on the grip, the position of the release button receives a large restriction in such a manner that the operability of the release button is remarkably decreased or the design of the release mechanism is compelled to be altered. For example, in case of the camera proposed by the above mentioned U.S. Pat. No. 3,597,068 the grip is provided with the connecting rod connectable with the pin member for the camera release provided at the side of the camera body when the grip is set in the operation state in such a manner that the camera release is carried out by operating this rod, in order to prevent the decrease of the operability of the camera release button due to the provision of the foldable grip.

However, if in case of the above mentioned construction the positioning of the grip in the operation state is not sure the connection between the connecting rod at the side of the grip and the release pin at the side of the camera body becomes incomplete in such a manner that such possiblity may take place that the camera release is carried out even if the rod at the side of the grip is operated, which might become a cause for the damage of the release mechanism.

SUMMARY OF THE INVENTION

The present invention, the above mentioned situation being taken into consideration, relates to a further improvement of a motion picture camera with a foldable grip whose rotating shaft is parallel to the optical axis of the photographic lens, whereby the purpose of the present invention is to offer a motion picture camera with an improved foldable grip, eliminating the above mentioned shortcomings.

Another purpose of the present invention is to offer a motion picture camera with an improved foldable grip, whereby the balance between the operability of the grip and the positioning of the operation button for the camera release is sufficiently taken into consideration in such a manner that the decrease of the operability of the release button as well as the alteration of the design of the release mechanism of the camera can be avoided. For this purpose it is proposed in accordance with the present invention to provide the camera release button coaxially to the rotation shaft of the grip provided parallel to the optical axis of the photographic lens.

Further another purpose of the present invention is, beside the above mentioned purposes, to eliminate the shortcomings of the camera with a conventional type of the foldable grip by providing a camera with a grip whose rotation shaft is parallel to the optical axis of the photographic lens, whereby when the tripod is used a stable photographing is possible, while when the grip is used the supporting point of the camera by the grip is almost in alignment with the center of the gravity of the camera and further even when the grip is folded into the loaded state the total width of the camera is not increased. For this purpose it is proposed in accordance with the present purpose that at the bottom surface of the camera body a showlder with a certain determined depth is provided and there is provided the rotation shaft of the grip parallel to the optical axis of the photographic lens of the camera, whereby the grip is mounted rotatably on the rotation shaft in such a manner that the grip is folded from the first position at which the grip support the camera body by the bottom surface into the second position at which the grip is loaded in close contact with the side surface of the above mentioned camera body.

Further in accordance with a preferred embodiment it is proposed that the axis of the rotation shaft of the grip is provided at a position distant from the center of the width of the camera by a distance corresponding to about ½ of the distance between the center of the width of the camera body and the center of the width of the grip loaded in the side surface of the above mentioned camera body.

Further another purpose of the present invention is to construct the interior of the above mentioned grip as the loading chamber for the current source of the camera in such a manner that the switching on and off is automatically controlled in accordance with the state, namely the operation state or the loaded state of the grip.

For this purpose in accordance with a preferred embodiment of the present invention it is proposed that an electrical connection means between the grip and the camera body is composed as a switch means to be controlled in accordance with the state, namely the operation state and the loaded state of the grip.

Further another purpose of the present invention is to provide the grip in such a manner that a nice appearance is obtained for the camera as a whole no matter in which state, namely the operation state or the loaded state, the grip is.

For this purpose in accordance with a preferred embodiment of the present invention it is proposed beside the above mentioned composition that in the side surface of the camera body a concave part for loading the grip is formed in such a manner that the grip in the loaded state is loaded in the concave part, whereby the end of the grip is almost in alignment with the height of the head of the camera body.

Further another purpose of the present invention is, beside the above mentioned purposes, to eliminate by the grip such danger that the operation members of the camera are misoperated or damaged when the camera is loaded in the case.

For this purpose, in accordance with a preferred embodiment of the present invention, it is proposed that on a certain determined part in which the grip is loaded, of the side surface of the camera body various operation members of the camera are arranged as much concentrated as possible in such a manner that when the grip is folded in the loaded state those operation members are protected by the grip.

Further other purposes and the features of the present invention will be disclosed from the explanations to be made below in accordance with the accompanying drawings.

BRIEF DESCRIPTION OF THE DRAWINGS

The drawings show an embodiment of the motion picture camera with a foldable grip in accordance with the present invention.

FIGS. 9 and 10 show a motion picture camera connected with the embodiment shown in FIGS. 6 and 7, whereby the electrical connection means between the grip and the camera body is constructed as a current source switch in a position to control the switching on and off of the current source in accordance with the states, namely the operation state or the loaded state of the grip in such a manner that in the loaded state of the grip the photograph can be taken with tripod, whereby;

FIG. 9 shows the important part of the above mentioned switching means, while;

DETAILED DESCRIPTION OF THE PREFERRED EMBODIMENTS

Figure 1:
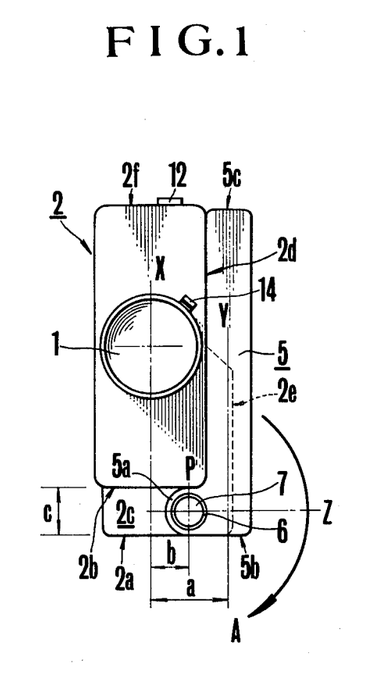
FIG. 1 shows a front view of the motion picture camera, whereby the grip is loaded in the side part of the camera.

In FIGS. 1 – 6, 1 is the photographic lens mounted on the camera body 2, presenting the optical axis. 2a is the first bottom surface of the camera body, 4 the mounting screw provided on the first bottom surface 2a for mounting the tripod (FIG. 3). 2b is the second bottom surface of the camera body, whereby the second bottom surface 2b is situated deeper than the first bottom surface 2a by C as is shown in FIG. 1. 3 is the bearing of the grip provided on the camera body 2, so as to be situated between the first bottom surface 2a and the second bottom surface 2b. (Details as per FIG. 6). 5 is the grip rotatably mounted on the grip bearing 3 of the camera body 2 at the bearing 5a by means of the hole shaft 6 (see FIG. 6), whereby the shaft 6 is provided parallel to the optical axis 0 of the photographic lens 1, while the grip 5 can be rotated from the operation position (FIG. 2) for bearing the camera body 2 by 180° around the shaft 6 so as to be folded in the loaded position at which the grip is loaded close to the side surface 2d of the camera body.

Hereby considering the appearance of the whole camera when the grip 5 is folded in the loaded state and the trouble when the camera is loaded in the case the side face 2d of the camera body 2 is composed as concave part a little deeper than the other side face 2e in order to contain the grip 5 while the camera bearing surface 5b and the end surface 5c of the grip 5 is designed so as to be in alignment with the first surface 2a and the top surface 2f of the camera body 2.

Further the above mentioned shaft 6a is, as is shown in FIG. 1, arranged on the center line Z between the first bottom surface 2a and the second bottom surface 2b of the camera body in such a manner that the center P is situated at a position distant from the center of the width of the camera body 2 by a distance b corresponding about ½ of the distance a from the center X of the width of the camera body 2 to the center Y of the grip body. 7 is the camera release button provided in the shaft 6, whose details will be explained later. 8 is the photographic mode changing over dial serving at the same time the main switch of the camera. 9 is the film feeding speed (frames/sec.) changing over switch, 10 the color conversion filter changing over dial, whereby these dials 8, 9 and 10 are arranged in group on the side surface 2d for loading the grip, so as to be protected by means of this grip 5 when the grip 5 is folded in the loaded state.

11 is the diaphragm adjusting dial, 12 the operation button for auto-zooming, whereby in the photographic lens 1, 13 is the focussing ring, 14 the operation lever for manualzooming.

Figure 5:
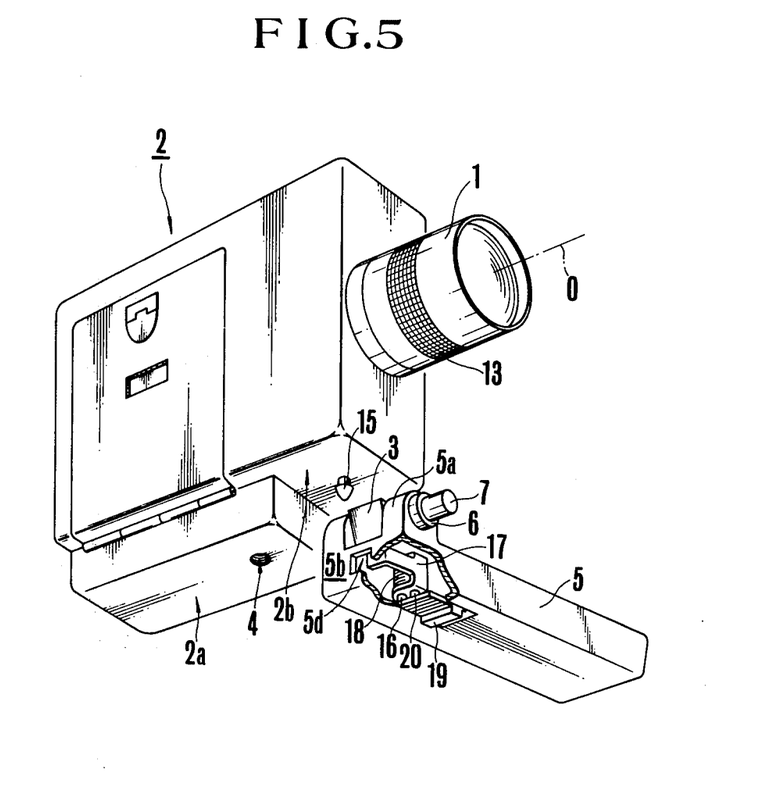
FIG. 5 shows the motion picture camera in perspective view for showing the locking mechanism to fix the grip on the camera body in operation state, whereby the important part is shown in section.

In FIG. 5 in which the important parts are shown in section, the grip 5 is provided with the locking mechanism for fixing the grip on the camera body in the operation state. Namely in the drawing, 15 is the hook piece fixed on the second bottom surface 2b of the camera body 2, whereby in the camera bearing surface 5b of the grip 5 corresponding to the hook piece 15 an opening 5d in which the hook piece 15 can be buried is provided. In the grip 5 the locking member 17 rotatably born on the shaft 16 is provided, whereby the locking member is forced by the coil spring 18 around the shaft in such a manner that the hook member 17 engaged with the hook piece 15, so as to fix the grip 5 on the camera body 2 when the hook member 15 is buried in the opening 5d. 19 is the operation dial for releasing the locking, being connected with the locking member 17 through the pin 20 in a fixed way whereby by means of operating the operating dial 19 the locking member 17 is rotated around the shaft 16 against the spring 18, so as to release the engagement of the locking member 17 with the hook piece 15.

Figure 6:
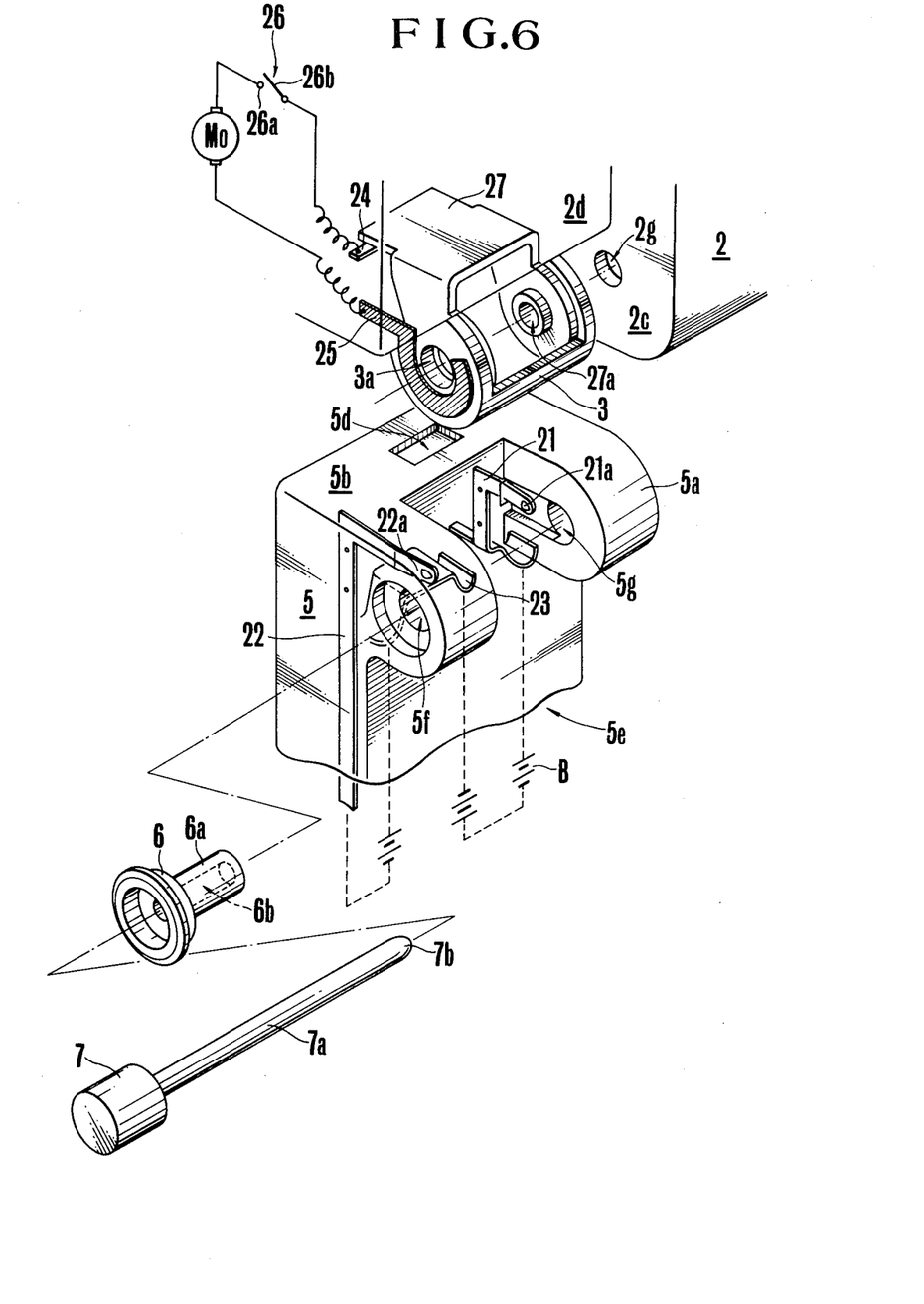
FIG. 6 shows the important part of the camera body and that of the grip in separated state in perspective view for showing the electrical connection between the grip and the camera body and the mounting means of the grip in case the inside of the grip is constructed as the current source loading charge.
Figure 7:
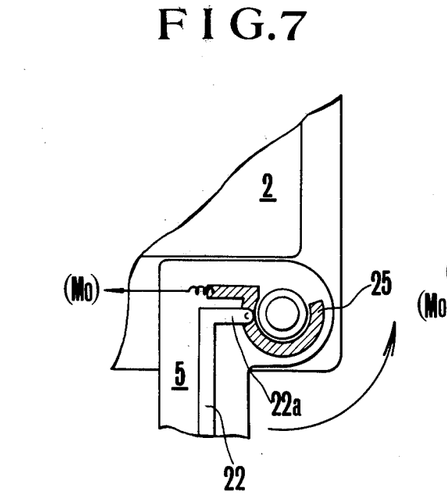
FIG. 7 shows the important part connected with FIG. 6, for showing the electrical connection between the grip and the camera body whereby the grip is mounted on the bearing in the camera body.

Hereby in accordance with FIGS. 6 and 7, the electrical connecting means between the grip 5 and the camera body 2 and the mode of the connection of the grip 5 with the grip bearing 3 of the camera body 2 in case the interior of the grip 5 is made use of as chamber for loading the current source.

As is shown in FIG. 6 the interior 5e of the grip 5 is constructed as chamber for loading current source B, being provided with the shoe 21 at (+) side, the shoe 22 at (−) side and the intermediate piece 23, whereby the slide tap 21a of the shoe 21 and the slide tap 22a of the shoe 22 respectively project from the inside of the bearing 5a of the grip 5. The current source B is loaded in the chamber 5e in the conventional way in such a manner that the positive terminal of the source B is connected to the shoe 21 while the negative terminal of the source B is connected to the shoe 22.

On the other hand the grip bearing part 3 of the camera body 2 is provided with the conductive piece 24 and 25 respectively corresponding to the conductive shoes 21 and 22 of the grip 25. (Although it is not clear in the drawing, the conductive piece 24 presents the same shape as the conductive piece 25.) In the state that the grip 5 is connected to the bearing part 3 the slide tap 21a of the shoe 21 at (+) side is in contact with the conductive piece 24 while the slide tap 22a of the shoe 22 at (−) side is in contact with the conductive piece 25 electrically, which situation is shown in FIG. 7.

Hereby Mo is the camera driving motor, being connected between the conductive pieces 24 and 25 together with the motor switch 26 to be closed by means of the release button 7 at the time of camera release.

Below the connection mode of the grip 5 with the grip bearing 3 of the camera body 2 will be explained.

As is shown in FIG. 6 in detail, the shaft 6 of the grip 5 presents a part 6a with small diameter, which part is led through the bearing boring 5f of the bearing 5a of the grip 5 and the bearig boring 3a of the grip bearing 3 in the state that the grip 5 is mounted on the grip bearing 3 of the camera body 2. Then the release rod 7a connected with the release button 7 is led through the bearing boring 6b of the shaft 6, the bearing boring 5g of the bearing 5a of the grip 5, the bearing boring 27a of the strengthening member 27 provided on the grip bearing 3 and the boring 2g in the front surface 2c formed between the first and the second buttom surface 2a and 2b of the camera body in such a manner that the grip 5 is mounted on the grip bearing 3 of the camera body 2, so as to be rotatable between the loaded position and the operation position.

Further at this time, the work end 7b of the release rod 7a connected with the release button 7 is buried in the interior of the camera body 2 through the boring 2g in the front surface 2c of the camera body 2.

In the state that the grip 5 is folded in the loaded position in case of the above mentioned composition (FIG. 1), the grip 5 is loaded in a compact way almost in contact with the side surface 2d of the camera body 2, whereby especially the operation dials 8, 9 and 10 arranged in group on the side surface 2d are covered by the grip 5 and in consequence there is no danger that dials be misoperated for example when the camera is loaded in the case.

In this loaded state the camera bearing surface 5b of the grip 5 is almost in alignment with the first bottom surface 2a of the camera body 2, while the end surface 5c is almost in alignment with the top surface 2f of the camera body 2 so that in case of the photography with tripod the first buttom surface 2a of the camera body 2 offers a part with large area around the tripod mounting screw 4 in such a manner that a photograph can be taken in a stable manner with tripod while there is no danger that the folded grip 5 stands in the way at the time of operating the operation button 12 for autozooming, the focussing ring 13, the operation lever 14 for manual-zooming and so on.

Figure 2:
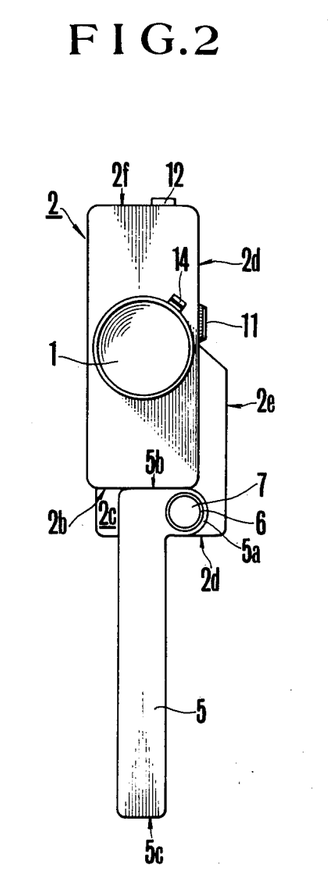
FIG. 2 shows a front view of the motion picture camera whereby the grip is set in the operation state.
Figure 3:
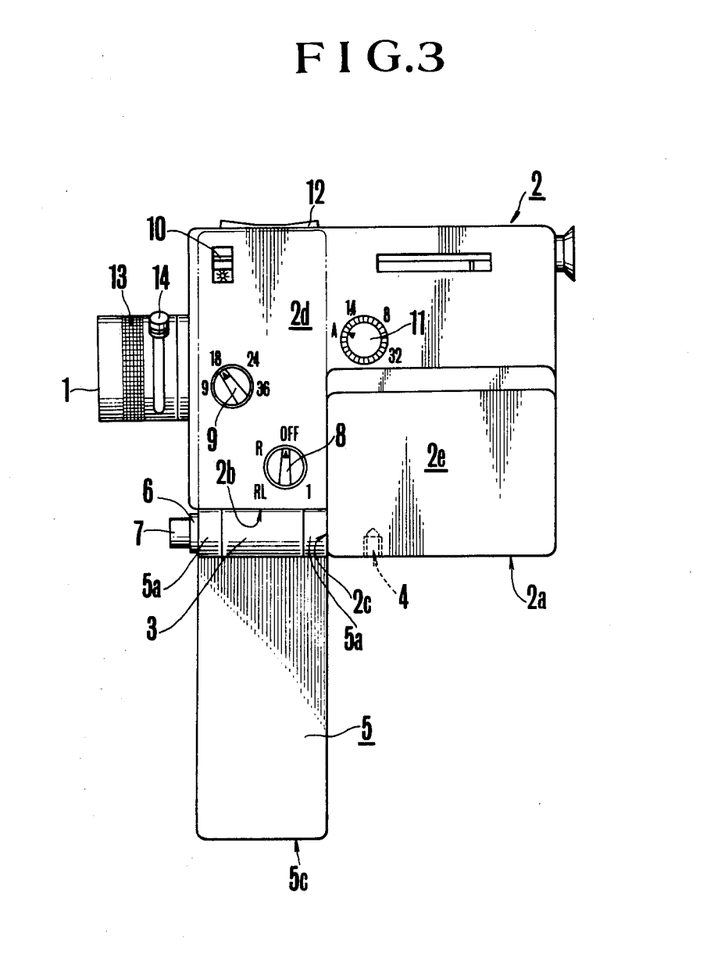
FIG. 3 shows a side view of the motion picture camera whereby the grip is set in the operation state.
Figure 4:
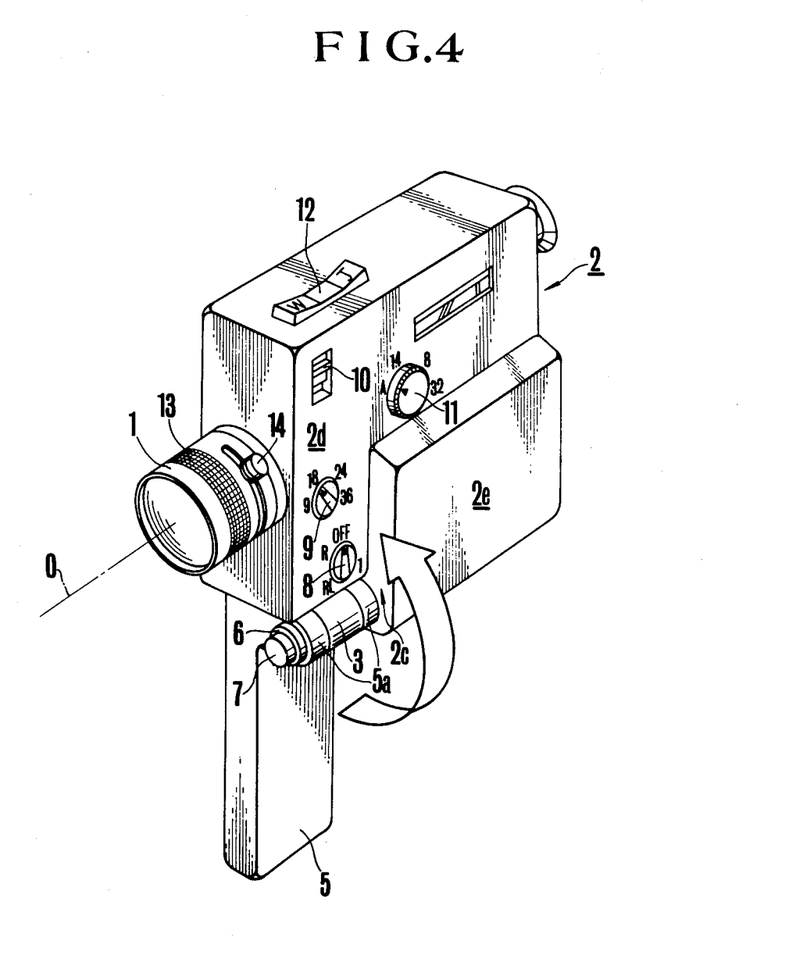
FIG. 4 shows the motion picture camera in perspective view whereby the grip is set in the operation state.

In the operation state shown in FIGS. 2 to 4, whereby the grip 5 is rotated around the shaft 6 (and the release button 7) by 180°, as shown by an arrow A in FIG. 1, from the state in FIG. 1, the grip 5 is fixed to the camera body 2 by means of the locking mechanism, whereby the center P of rotation of the grip 5 is situated at the above mentioned position with reference of the camera body 2 so that the support point of the grip 5 is almost directly under the center of the camera body 2. In this way the photographer can hold the grip 5 almost directly under the center of gravity of the camera body 2, so that photograph can be taken, being held in hand, in a well balanced and stable state.

By providing the shaft 6 of the grip in C between the first bottom surface 2a and the second bottom surface 2b of the camera body 2 as explained above, it has become possible to make the diameter of the bearing part 5a of the grip 5 almost up to the difference C, so that the strength of the grip itself is increased while such inconvenience that the bearing part of the grip projects largely on the side surface of the camera body.

Figure 8:
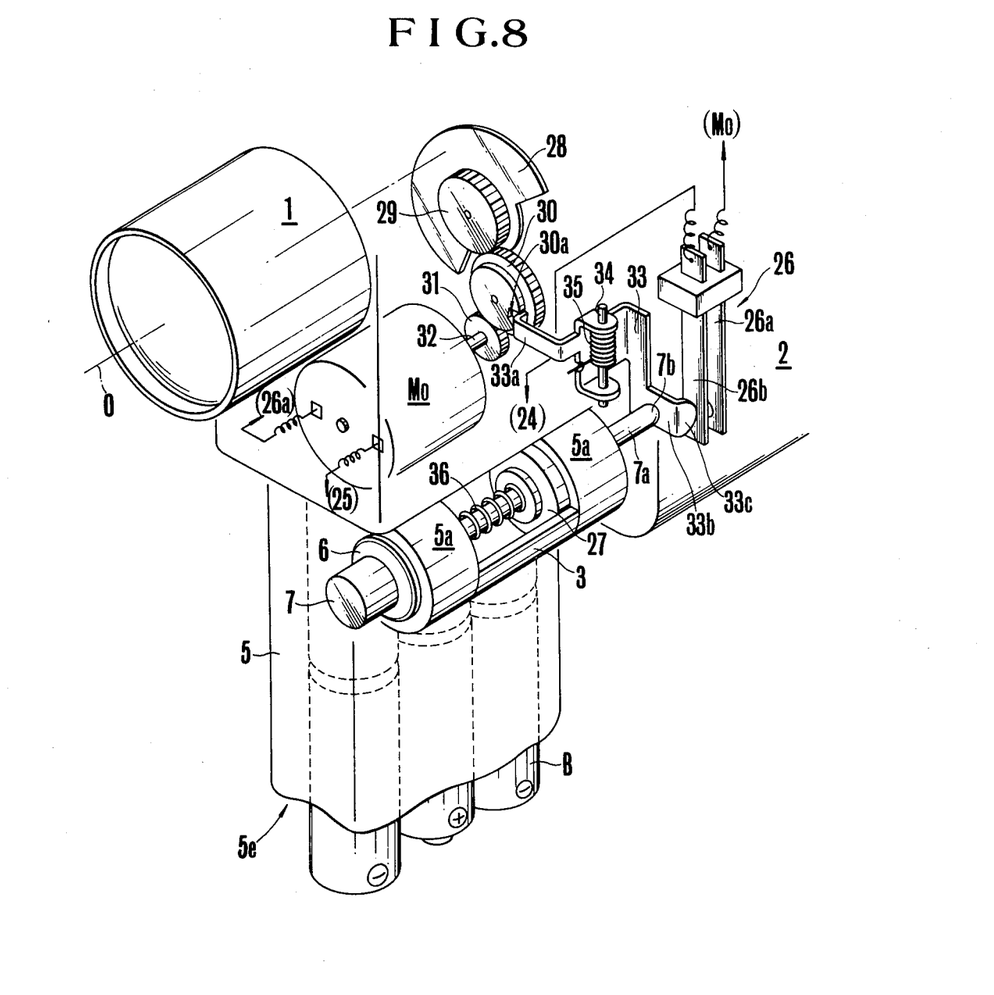
FIG. 8 shows the important part of the camera in perspective view for showing the camera release button and the release mechanism in the camera.

Below the mechanism of the camera release will be explained in accordance with FIG. 8.

In the drawing, 28 is a conventional rotary shutter disc, which is connected with the gear 31 fixed on the output shaft 32 of the driving motor so as to be driven by means of the gear 29 made as one body with the shutter disc 28 and the intermediate gear 30.

33 is a shutter engaging member which engages the shutter disc 28 at a position at which the photographing opening not shown in the drawing is closed by the shutter disc 28, by engaging the intermediate gear 30, whereby the shutter engaging member presents a work arm 33a engageable in a notch 30a formed at a part of the intermediate gear 30, so as to engage the intermediate gear 30, being rotatably born by the shaft 34 and forced by means of the spring along the direction along which the work arm 33a engages in the notch 30a of the intermediate gear 30, namely clockwise around the axis of the shaft 34 in the drawing.

The above mentioned release rod 7a is buried in the interior of the camera body 2 in such a manner that the work end 7b is apposed close to the end part 33b of the engaging member 33, whereby the above mentioned motor switch 26 is arranged so as to be closed by means of the projection 33c of the engaging member 33c at the time of shutter release. Hereby the one contact piece 26a of the switch 26 is connected to the above mentioned Mo while the other contact piece 26b is connected to the conductive piece 24 (FIG. 6).

36 is the returning spring of the release button 7, normally forcing the button 7 to the left in the drawing.

Consequently when the release button 7 is depressed against the force of the spring 36 at the time of taking photograph, the end part 33b of the engaging member 33 is pushed by the work end 7b of the release rod 7a so as to be rotated anticlockwise around the axis of the shaft 34 against the force of the spring 35 in such a manner that the engagement of the intermediate gear 30 by means of the work arm 33a while the motor switch 26 is closed by its projecting part 33c. Thus the current source B loaded in the grip supplies current to the motor Mo with current so as to start the motor Mo, whereby because the engagement of the intermediate gear 30 is released the driving power of the motor Mo is transmitted to the shutter disc 28 in such a manner that the shutter disc 28 rotates at a certain determined speed so as to take pictures.

By making use of the center of rotation of the grip 5 at the same time as the central shaft of the release button 7, the photographer is in a position to operate the release button 7 at a position nearer to the camera body while at the same time no only there is such profit that the position 9f the release button 7 is same both in the loaded state of the grip in FIG. 1 and in the operation state of the grip in FIG. 2 but also it is rational to be able to provide a common shaft by making use of the center of rotation of the grip 5 at the same time as the central shaft of the release button 7.

Figure 9:
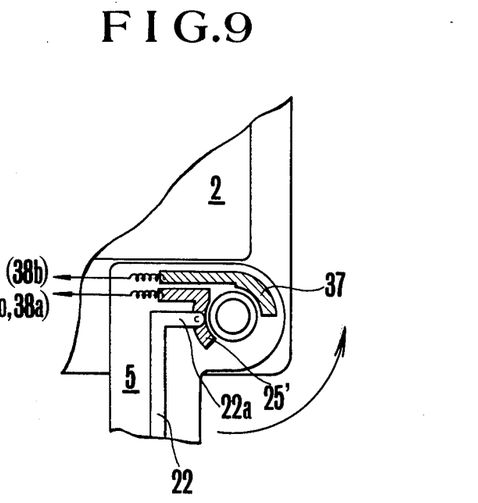
Figure 10:
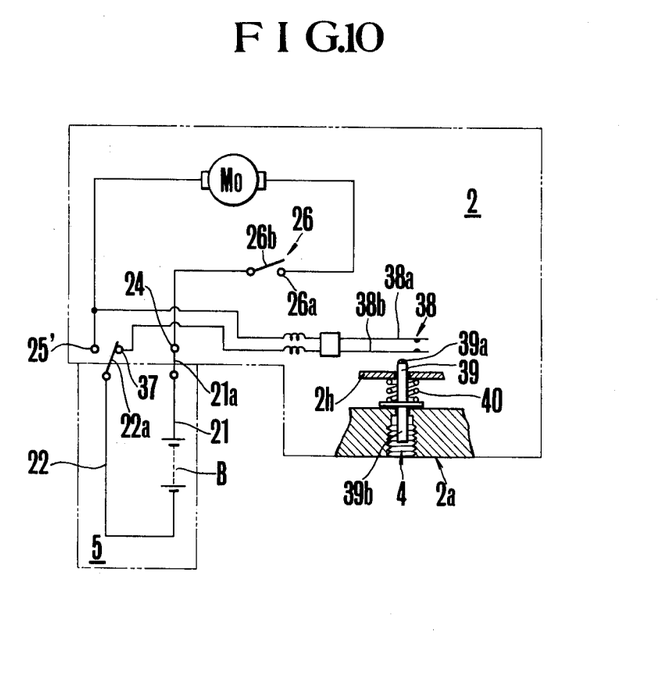
FIG. 10 shows the then electrical circuit.

If in case of a motion picture camera presenting a foldable grip as explained above it is so designed that the current source of the camera can automatically be switched on and off in accordance with the changing over of the grip into the operation state or the loaded state, further other profits can be obtained, whereby in this connection an embodiment of the camera so designed that the electrical connection means between the grip and the camera body shown in FIGS. 6 and 7 is constructed as a switch means for switching on and off in accordance with the state, namely the operation state and the loaded state of the grip whereby in the loaded state of the grip pictures can be taken by means of tripod will be explained below in accordance with FIGS. 9 and 10.

In case of the camera shown in FIGS. 9 and 10 two, namely the first conductive piece 25' and 37 are provided on the side of the camera body 2, corresponding to the slide tape 22a of the conductive shoe 22 at the (−) side of the grip as is shown in FIG. 9, whereby it is so designed that the first conductive piece 25' is in contact with the slide tap 22a of the above mentioned shoe 22 only when the grip 5 is set in the operation state while the second conductive piece 37 is in contact with the slide tap 22a of the above mentioned shoe 22 only when the grip 5 is in the loaded state. Hereby the first conductive piece 25' is connected to the one contact piece 38a of the sub-switch (FIG. 10) to be automatically closed when the motor Mo and the camera are mounted on the tripod while the second conductive piece 37 is connected to the other contact piece 38b of the above mentioned sub-switch 38.

In FIG. 10, 39 is the switch control member for automatically closing the sub-switch 38 when the tripod is used, whereby its work end 39a is led through the boring formed in the separation wall 2h in the interior of the camera so as to be opposed close to the above mentioned sub-switch and slidable up and down in FIG. 10, while by means of the spring 40 the end 39b is normally forced along the direction along which the end 39b is buried in the screw boring. Other constructions are same as explained in accordance with FIGS. 6 to 8.

When in case of the above mentioned composition, the grip 5 is set in the operation state, the tap 22a of the conductive shoe 22 of the grip 5 enters into contact with the first conductive piece 25' so that when the motor switch 26 is closed, the release button 7 being operated, the current supply circuit of the motor Mo is formed in a similar way to the above so that the motor Mo starts to rotate while when the grip 5 is set in the loaded state the tap 22a of the shoe 22 enters into contact with the second conductive piece 37, so that as is shown in FIG. 10, the sub-switch 38 in functional engagement with the mounting of the tripod is connected in the motor circuit, whereby the camera does not operate because the current supply circuit of the motor Mo is not formed even if the motor switch 26 is closed, the release button 7 being operated.

When on the other hand, the camera in which the grip 5 is in the loaded state is mounted on the tripod the end 39b of the control member 39 is pushed by means of the tripod screw not shown in the drawing and raised upwards in the drawing, against the force of the spring 40 whereby the sub-switch 38 is closed by the work end 39a.

Thus even if the grip 5 is folded in the loaded state, the camera is automatically set in the mode in which the camera can immediately be operated by the operation of the release button 7, simply by mounting the camera on the tripod.

Hereby the combination of the tap 22a of the shoe 22 of the grip 5 with the first conductive piece 25' at the side of the camera body is intended simply to realize the function of the main-switch for the sub-switch 38.

As explained above in detail, in accordance with the present invention such shortcomings as mentioned above of this kinds of the conventional motion picture camera can all be eliminated whereby a motion picture camera presenting this kind foldable grip excellent not only in function but also in design can be realized.

Especially when the camera release button is provided coaxially with the rotation shaft of the grip, a very convenient form can be obtained with reference to the operability of the release button when the camera is used.

What is claimed is:

1. A motion picture camera comprising:
   A. a camera body including a bottom wall and a side wall;
   B. a grip adapted for holding a camera, said grip being constructed independently of said camera body;
   C. link means for pivoting said grip rotatably on said camera body, said link means being provided with a mounting orifice, said grip being pivoted rotatably on said camera body by said link means between a first position protruding outwardly from said camera body generally outstanding from said bottom wall thereof and a second position where said grip is folded along said side wall of said camera body; and
   D. actuating means adapted to actuate said camera, said actuating means being attached to said link means through said mounting orifice thereof to be slidable along said mounting orifice in response to manual operation for actuating said camera.

2. A motion picture camera according to claim 1, further comprising:
   a picture-taking lens fixedly mounted on said camera body, said picture-taking lens having an optical axis, said link means being attached to the camera body to be substantially in parallel with the optical axis of said picture-taking lens, and said grip being rotatable between said first position and second position about an axis of rotation which is substantially in parallel with the optical axis.

3. A motion picture camera according to claim 2, wherein said camera body has a shoulder part with a predetermined depth on said bottom wall, and said link means is provided within said shoulder part.

4. A motion picture camera according to claim 3, wherein said link means is provided at a position spaced from the center of the width of the camera body by a distance corresponding to about one-half the distance between the center of the width of the camera body and the center of the width of the grip when the grip is folded to said second position.

5. A motion picture camera according to claim 2, further comprising:
   setting means manually operable from the outside of the camera body for adjusting the camera at the time of picture taking, said setting means being provided on a portion of said side wall of the camera body in such a manner that said setting means is covered by said grip when the grip is folded to said second position.

6. A motion picture camera according to claim 2, further comprising:
   releasable lock means for fixing said grip to the camera body when the grip is set to said first position.

7. A motion picture camera according to claim 6, wherein said grip is provided with a chamber for loading a current source of the camera; and
   first contact means adapted for connecting the current source with the camera body;
   and said camera body is provided with:
   second contact means adapted to be electrically connected with said first contact means of the grip only when the grip is set to said first position;
   whereby the current is supplied to the camera body through said first and second contact means only whent the grip is set to said first position.

8. A motion picture camera according to claim 7, wherein said camera body is further provided with:
   switch means for connecting said current source with the camera body when the camera body is mounted on a tripod, said switch means being disposed at a position in which the switch means is actuated by a portion of said tripod when the camera body is mounted on the tripod; and
   third contact means adapted for connecting said switch means with said first contact means of the grip when the grip is folded at said second position, said third contact means being disposed on a position in which the third contact means is electrically connected with said first contact means when the grip is folded at said second position;
   said switch means being electrically connected respectively with said second and third contact means.

9. A motion picture camera comprising:
   A. a camera body;
   B. a grip adapted for holding said camera, said grip constructed to be independent of said camera body and provided with a first through hole at a part thereof;
   C. A hollowed cylindrical means corresponding to said first through hole of the grip for pivotally mounting said grip to said camera body, said cylindrical means being provided with a second through hole and attached to said camera body by being inserted through the first through hole of said grip; said grip being pivoted rotatably between a first position protruding outright from the camera body at a portion on the bottom wall thereof and the second position where said grip is folded along a portion on a side wall of the camera body in cooperation with engagement of said cylindricl means within said first through hole; and D. actuating means adapted for actuating said camera, said actuating means being mounted on the cylindrical means by being inserted through said second through hole of said cylindrical means to be slidable along said second through hole in response to a manual operation for actuating said camera.

10. A motion picture camera according to claim 9, further comprising:

a picture-taking lens fixedly mounted on said camera body, said picture-taking lens having an optical axis, said cylindrical means being attached to the camera body at a part thereof to be substantially in parallel with the optical axis of the picture-taking lens, and said grip being rotatable between said first position and said second position about an axis of rotation which is substantially in parallel with the optical axis.

11. A motion picture camera comprising:

A. a camera body, said camera body being provided at a portion thereof with a first through hole;

B. a grip adapted for holding a camera, said grip constructed to be independent of said camera body;

C. a hollowed cylindrical means corresponding to said first through hole of the camera body for pivotally mounting said grip on said camera body, said cylindrical means being provided with a second through hole and being attached to said grip to be inserted through the first through hole of the camera body, said grip being pivotally mounted on said camera body to be rotatable between a first position protruding outright from the camera body at a portion on the bottom wall thereof and a second position where said grip is folded along the camera body at a portion on a side wall thereof in cooperation with engagement of said cylindrical means within said first through hole of the camera body; and D. actuating means adapted for actuating said camera, said actuating means being mounted on the cylindrical means to be inserted through the second through hole of said cylindrical means and to be slidable along said second through hole in response to a manual operation for actuating said camera.

12. A motion picture camera according to claim 11, further comprising:

a picture-taking lens fixedly mounted on said camera body, said picture-taking lens having an optical axis, said first through hole being provided on the camera body at one part thereof to be substantially in parallel with the optical axis of said picture-taking lens, and said grip being adapted to be rotatable between said first position and said second position about an axis of rotation which is substantially in parallel with the optical axis.

13. A motion picture camera comprising:

A. a camera body, said camera body being provided at one part thereof with a first through hole;

B. a grip adapted for holding said camera; said grip being provided at one portion thereof with a second through hole corresponding to said first through hole of said camera body, and being constructed to be independent of said camera body, furher being attached to the camera body at one part thereof so as to arrange said second through hole to be in alignment with said first through hole; and C. actuating means adapted for actuating said camera, said actuating means being equipped to be inserted through said second through hole of the grip and said first through hole of the camera body so as to be slidable along said first and second through holes in response to manual operation for actuating said camera, said grip being pivoted to said camera body at one part thereof to be rotatable between a first position protruding outright from the camera body at a portion on the bottom wall thereof and a second position where said grip is folded along the camera body at a portion on a side wall thereof in cooperation with at least one portion of said actuating means.

14. A motion picture camera according to claim 13, further comprising:

a picture-taking lens fixedly mounted on said camera body, said picture-taking lens having an optical axis, said first through hole being provided on the camera body at one part thereof to be substantially in parallel with the optical axis of said picture-taking lens, and said grip being rotatable between said first position and said second position about an axis of rotation which is substantially in parallel with the optical axis.

15. A motion picture camera comprising:

A. a camera body provided with
  a shutter mechanism and
  a projecting portion protruding from an outer wall of the camera body, said projecting portion having a first through hole;

B. a grip adapted for holding the camera, said grip being provided at one portion thereof with a second through hole corresponding to said first through hole of said projecting portion, and being constructed to be independent of said camera body, further being attached to the camera body at the projecting portion thereof so as to arrange said second through hole to be in alignment with said first through hole;

C. a hollowed cylindrical means for pivotally mounting said grip to be rotatable to said camera body on the projecting portion thereof, said cylindrical means being provided with a third through hole and being attached to the camera body at the projecting portion thereof to be inserted through said first through hole of said projecting portion and said second through hole of the grip;

said grip being pivotally mounted on said camera body at the projecting portion thereof to be rotatable between a first position protruding outright from the camera body at a part on the bottom wall thereof and a second position where said grip is folded along the camera body at a part on a side wall thereof in cooperation with engagement of said cylindrical means within said first and second through holes; and D. manually operable trigger means adapted for triggering the camera, said trigger means being provided with a sliding member for triggering said shutter mechanism, said sliding member being equipped on the cylindrical means to be inserted through the third through hole of said cylindrical means and being slidable along said third through hole for triggering said shutter mechanism in response to said manual operation for triggering the camera.

16. A motion picture camera comprising:
A. a camera body being provided with a picture-taking lens having an optical axis; a shutter mechanism; and a projecting portion protruding from the camera body at a part on the bottom wall thereof, said projecting portion having a first through hole substantially in parallel with the optical axis of said picture-taking lens;
B. a grip adapted for holding the camera, said grip being povided at one portion thereof with a second through hole corresponding to said first through hole of said projecting portion, and being constructed to be independent of said camera body, further being attached to the camera body at the projecting portion thereof so as to arrange said second through hole to be in alignment with said first through hole;
a hollowed cylindrical means for pivotally mounting said grip to be rotatable to said camera body on the projecting portion thereof, said cylindrical means being provided with a third through hole and being attached to the camera body at the projecting portion thereof to be inserted through said first through hole of said projecting portion and said second through hole of the grip;
said grip being pivotally mounted on said camera body at the projecting portion thereof to be rotatable between a first position protruding outright from the camera body at a part on the bottom wall thereof and a second position where said grip is folded along the camera body at a part on a side wall thereof with the help of engagement of said cylindrical means within said first and second through holes; and
D. manually operable trigger means adapted for triggering the camera, said trigger means being provided with a sliding member for triggering said shutter mechanism, said sliding member being equipped on the cylindrical means to be inserted through the third through hole of said cylindrical means and being slidable along said third through hole for triggering said shutter mechanism in response to said manual operation for triggering the camera.

17. A motion picture camera comprising:
a camera body;
lens means;
a foldable grip member having a generally longitudinal configuration with a first and a second end adapted to be gripped by an operator during an operation of said camera;
link means rotatably mounting said grip member at said first end upon said camera body for pivotal movement about a pivotal axis between a first pivotal position where said grip may be held by an operator to support said camera during operation thereof and a second pivotal position;
said grip being configured to extend longitudinally outwardly from said camera body with said second end remote therefrom when in said first pivotal position and to extend alongside said camera body in close proximity thereto when in said second pivotal position;
film transport means located within said camera for transporting film therethrough in operative relationship with said lens means; and
actuating means for controlling operation of said film transport means to start and stop operation of said camera;
said actuating means comprising an elongated rod mounted to extend concentrically with said grip member pivot axis coaxially therewith;
said elongated rod having a first end located exteriorly of said camera to constitute a push button which may be depressed and released by an operator to start and stop said camera and a second end engaging said actuating means interiorly of said camera to effect starting and stopping of said film transport means in dependence upon the position of said elongated rod.

* * * * *